(12) United States Patent
Miyoshi et al.

(10) Patent No.: US 6,889,041 B2
(45) Date of Patent: May 3, 2005

(54) MOBILE COMMUNICATION SYSTEM (75) Inventors: Kenichi Miyoshi, Yokohama (JP); Katsuhiko Hiramatsu, Yokosuka (JP); Takahisa Aoyama, Yokosuka (JP); Atsushi Sumasu, Yokosuka (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 308 days.

(21) Appl. No.: 10/069,375
(22) PCT Filed: Jun. 25, 2001
(86) PCT No.: PCT/JP01/05395

§ 371 (c)(1),
(2), (4) Date: Feb. 25, 2002

(87) PCT Pub. No.: WO02/01908

PCT Pub. Date: Jan. 3, 2002

(65) Prior Publication Data

US 2002/0137519 A1 Sep. 26, 2002

(30) Foreign Application Priority Data

Jun. 26, 2000 (JP) .................................. 2000-232268
Jul. 5, 2000 (JP) .................................. 2000-204222

(51) Int. Cl.[7] ............................................. H04Q 7/20
(52) U.S. Cl. ...................... 455/423; 455/69; 455/522; 455/67.11; 370/318; 370/333
(58) Field of Search ................... 455/67.11, 67.14, 455/68–69, 423–425, 452.1, 522, 115.1–115.4, 226.1, 226.2; 370/318, 320, 333, 335, 342, 465, 468–469

(56) References Cited

U.S. PATENT DOCUMENTS 5,594,729 A * 1/1997 Kanakia et al. ............. 370/391
5,812,938 A * 9/1998 Gilhousen et al. ............ 455/69
6,205,129 B1 * 3/2001 Esteves et al. ............. 370/331
6,597,894 B1 * 7/2003 Ue et al. ..................... 455/69

FOREIGN PATENT DOCUMENTS

| JP | 01289324 | 11/1989 |
| JP | 02274131 | 11/1990 |
| JP | 07250116 | 9/1995 |

OTHER PUBLICATIONS

International Search Report dated Sep. 25, 2001.
"CDMA:HDR: High Efficiency High Speed Wireless IP Solution", QUALCOMM Incorporated, Mar. 28, 2000.
1xHDR Overview; "Proposed CDMA2000 Companion High Data Rate (HDR) Standard", pp. 1–19.
3GPP2–COO–20000327, Mar. 27, 2000, pp. 1–319.

* cited by examiner

*Primary Examiner*—Duc Nguyen
(74) *Attorney, Agent, or Firm*—Stevens, Davis, Miller & Mosher, LLP (57) ABSTRACT

A mobile communication system which is capable of, when carrying out mobile communication using a shared channel, increasing in efficiency of transmission timing of the data transmission rate request value to prevent wasteful power consumption and hence reduce power consumption. The mobile station apparatus 102 of the mobile communication system measures CIR of the received signal from the base station apparatus 101 at the CIR measuring section 306, and decides the data transmission rate request value corresponding to the measured CIR value at the rate request value deciding section 307. Also, it detects an error of the received signal at the CRC section 304, and, when no error is found, calculates a difference between the average data transmission rate from the base station apparatus 101 and the data transmission request value at the rate request value transmission controlling section 308. Then, it transmits the data transmission rate request value to the base station apparatus 101 only when the obtained difference is larger than a threshold value.

15 Claims, 7 Drawing Sheets

MOBILE COMMUNICATION SYSTEM

TECHNICAL FIELD

The present invention relates to a mobile communication system, and to a base station apparatus and a mobile station apparatus constituting the same.

BACKGROUND ART

As one of the standards for the mobile communication system, there is a standard called cdma2000. To cdma2000 is applied HDR (High Data Rate) which uses a dedicated frequency band for data communication in addition to a dedicated frequency band for voice communication. In HDR, a shared channel in which the dedicated frequency band (channel) for data communication is shared by a plurality of users is used.

The shared channel is defined as a channel in which data transmission rate (hereinafter, simply referred to as "rate") is appropriately changeable, and the same frequency is used by a plurality of mobile station apparatuses wherein only one mobile station apparatus that has been selected by a base station apparatus is permitted to use exclusively the frequency in time-sharing mode to carry out data communication.

In a conventional mobile communication system, which uses such shared channel as described above, first, a plurality of mobile station apparatuses receive a pilot burst signal transmitted from a base station apparatus. Then, each mobile station apparatus measures CIR (Carrier to Interference Ratio), which represents the reception quality, based on the received pilot burst signal, and transmits a rate request value according to the CIR measurement value to the base station apparatus. At this time, transmission of the rate request value is carried out from every mobile station apparatus within the communication area at the same timing. Then, the base station apparatus, on receiving the rate request value from each mobile station apparatus, selects a mobile station apparatus to which data is to be transmitted based on the received rate request values, and transmits the data to the relevant mobile station apparatus at a rate of the rate request value received from the selected mobile station apparatus.

However, in the conventional system, since the data is transmitted only to the mobile station apparatus that has been selected by the base station apparatus, the mobile station apparatus, even when it transmits the rate request value, can not receive the data unless it is selected by the base station apparatus, and thus needs to transmit the rate request value continuously until it is selected by the base station apparatus.

That is to say, when the rate request value transmitted from the mobile station apparatus is smaller than a rate assigned to the data transmission by the base station apparatus, the relevant mobile station apparatus is rarely selected but nevertheless needs to transmit the rate request value continuously, thus resulting in a problem of useless electric power consumption for that continuous period of time. Since the power consumption for the transmission in the mobile station apparatus is large, a battery runs out earlier due to useless power consumption.

Further, when the mobile station apparatus is in a standstill or moving at a low speed, the mobile station apparatus transmits every time the same rate request value, even though CIR fluctuates little. Therefore, in this case also, there is such a problem of useless electric power consumption.

DISCLOSURE OF THE INVENTION

It is an object of the present invention to provide a mobile communication system that is capable of, when carrying out mobile communication using a shared channel, increasing in efficiency of transmission timing of the data transmission rate request value to prevent wasteful power consumption and hence reduce power consumption.

According to an aspect of the invention, a mobile communication system comprises a mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, wherein the mobile station apparatus comprises first receiving means for receiving an average data transmission rate transmitted from the base station apparatus, measuring means for measuring quality of the received signal from the base station apparatus, deciding means for deciding the data transmission rate request value based on the reception quality measured by the measuring means, first calculating means for calculating a difference between the data transmission rate request value decided by the deciding means and the average data transmission rate received by the first receiving means, judging means for judging whether or not the result of calculation by the first calculating means is equal to or larger than a reference value, and first controlling means for making the data transmission rate request value decided by the deciding means be transmitted to the base station apparatus when it is judged by the judging means that the result of calculation by the first calculating means is equal to or larger than the reference value, and wherein the base station apparatus comprises second receiving means for receiving the data transmission rate request value transmitted from the mobile station apparatus, selecting means for selecting the mobile station apparatus to which data is transmitted based on the data transmission rate request value received by the second receiving means, second calculating means for calculating an average of a data transmission rate for transmitting data to the mobile station apparatus selected by the selecting means as the average data transmission rate, and second controlling means for making the average data transmission rate calculated by the second calculating means be transmitted to the mobile station apparatus.

According to another aspect of the invention, a mobile communication system comprising a mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, wherein the mobile station apparatus comprises first measuring means for measuring quality of the received signal from the base station apparatus, deciding means for deciding the data transmission rate request value based on the reception quality measured by the first measuring means, first storing means for storing the data transmission rate request value decided by the deciding means, first judging means for comparing the previous data transmission rate request value stored in the first storing means and the latest data transmission rate request value, and judging whether or not both thereof are different from each other, and controlling means for making the latest data transmission rate request value be transmitted to the base station apparatus when it is judged by the first judging means that the previous data transmission rate request value and the latest data transmission rate request value are different from each other, and wherein the base station apparatus comprises second measuring means for measuring quality of the received signal from the mobile station apparatus, receiving means for receiving the data transmission rate request value transmitted from the mobile station apparatus, second storing means for storing the data transmission rate request value received by the receiving means by relating it to the mobile station apparatus, second judging means for judging, when there is any mobile station apparatus the data transmission rate request value of which has not been received this time by the receiving means, as for the relevant mobile station apparatus, whether or not the reception quality measured by the second measuring means is equal to or larger than a reference value, and control means for using, when it is judged by the second judging means that the measured value of the reception quality is equal to or larger than the reference value, as for the relevant mobile station apparatus, the previous data transmission rate request value stored in the second storing means as the data transmission rate request value to be used for selecting the mobile station apparatus to which data is transmitted.

BEST MODE FOR CARRYING OUT THE INVENTION

Embodiments of the present invention will be described below in detail with reference to accompanying drawings.
(First Embodiment)

Figure 1:
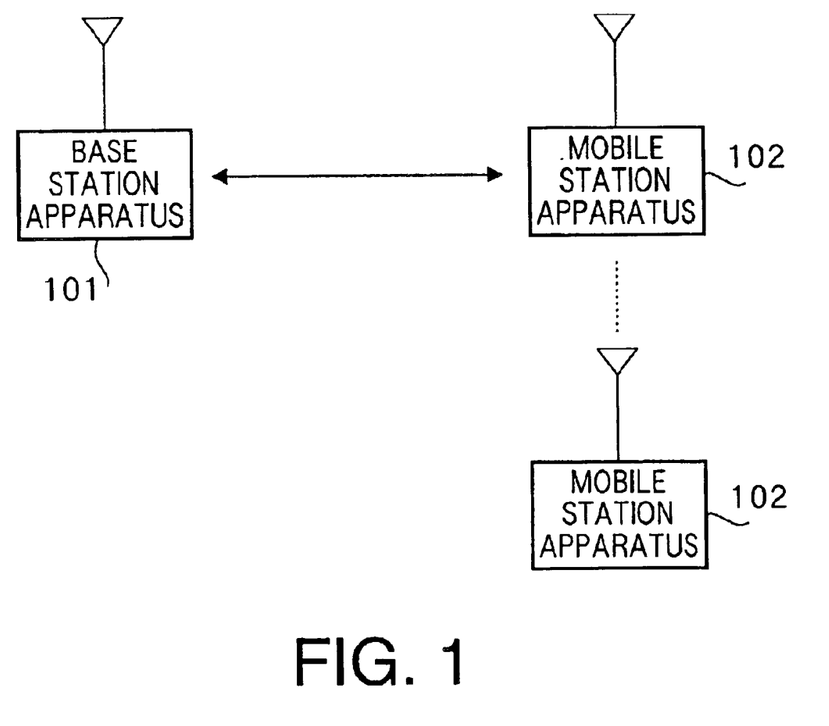
FIG. 1 is a block diagram illustrating a constitution of a mobile communication system according to a first embodiment of the present invention.

FIG. 1 is a block diagram illustrating a constitution of a mobile communication system according to a first embodiment of the present invention.

This mobile communication system includes, as shown in FIG. 1, a base station apparatus 101 and a plurality of mobile station apparatuses 102. The base station apparatus 101 and the mobile station apparatus 102 carry out radio communication using a shared channel in HDR applied to cdma2000.

Figure 2:
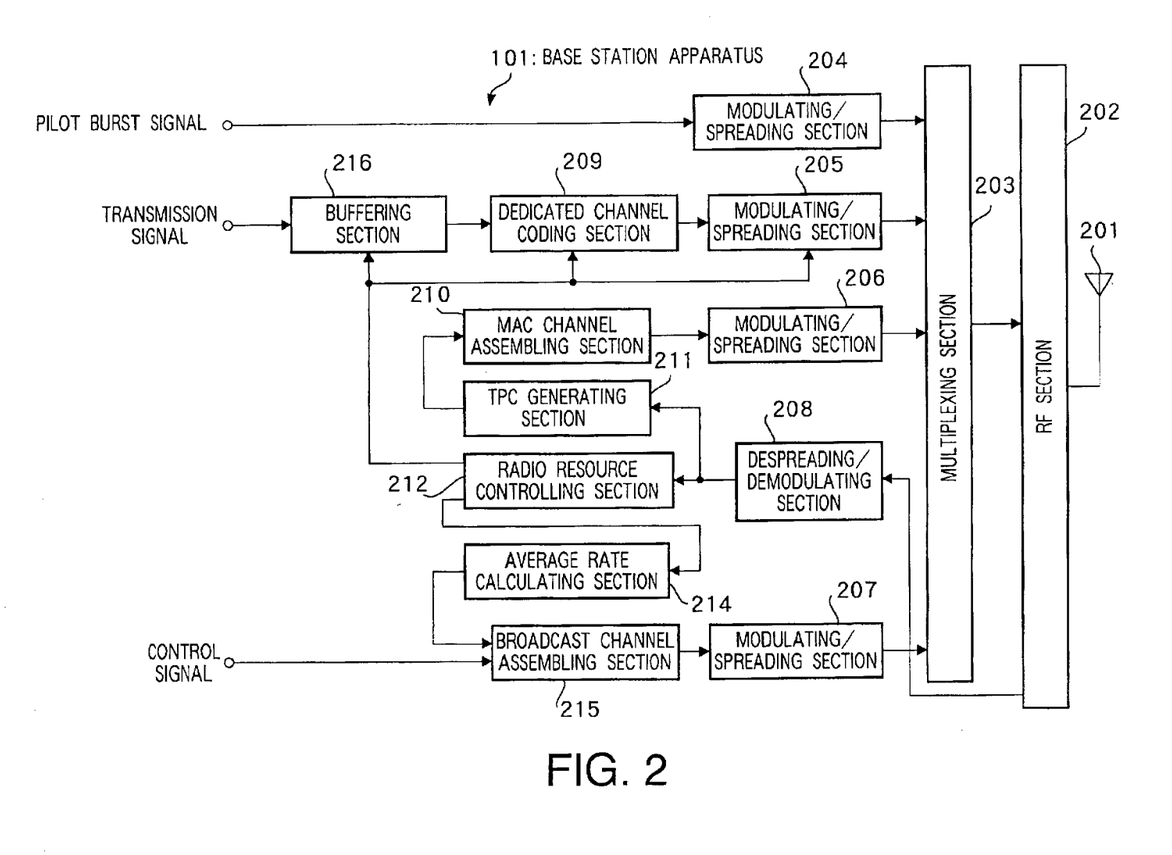
FIG. 2 is a block diagram illustrating a constitution of a base station apparatus in the mobile communication system according to the first embodiment of the present invention.

The base station apparatus 101 includes, as shown in FIG. 2, an antenna 201 for transmitting/receiving common use, an RF (Radio Frequency) section 202, a multiplexing section 203, four modulating/spreading sections 204, 205, 206 and 207, a despreading/demodulating section 208, a dedicated channel coding section 209, a MAC (Medium Access Control) channel assembling section 210, a TPC (Transmit Power Control) generating section 211, a radio resource controlling section 212, an average rate calculating section 214, a broadcast channel assembling section 215 and a buffering section 216.

Figure 3:
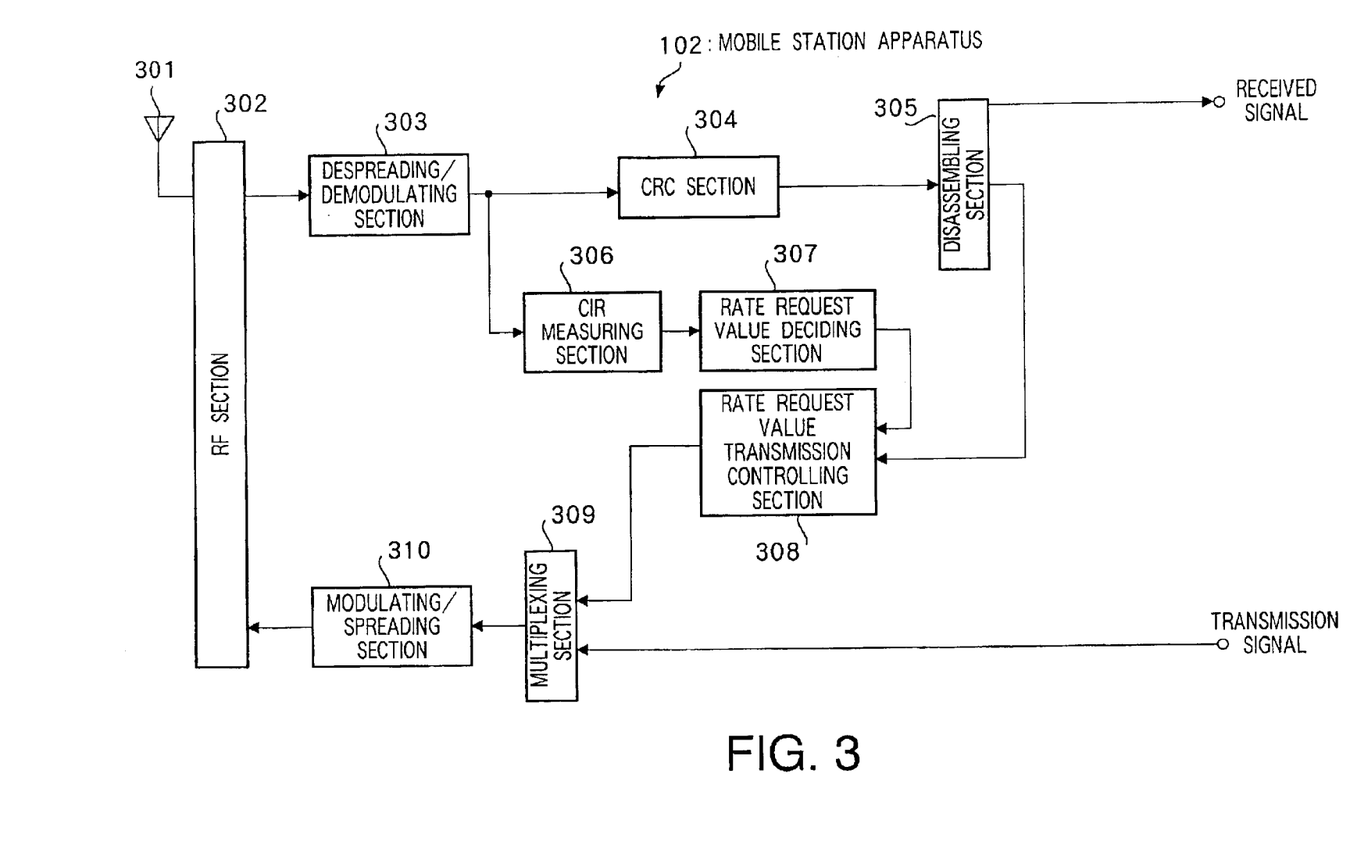
FIG. 3 is a block diagram illustrating a constitution of a mobile station apparatus in the mobile communication system according to the first embodiment of the present invention.

The mobile station apparatus 102 includes, as shown in FIG. 3, an antenna 301 for transmitting/receiving common use, an RF section 302, a despreading/demodulating section 303, a CRC (Cycle Redundancy Check) section 304, a disassembling section 305, a CIR (Carrier to Interference Ratio) measuring section 306, a rate request value deciding section 307, a rate request value transmission controlling section 308, a multiplexing section 309 and a modulating/spreading section 310.

Next, the operation of the mobile communication system having the constitution as described above will be described.

First, the base station apparatus 101 modulates and spreads a pilot burst signal in the modulating/spreading section 204.

Then, the modulated and spread pilot burst signal is multiplexed with other various signals that have been modulated and spread (for example, an average rate signal assigned to the shared channel, which will be described later, etc.) in the multiplexing section 203, subjected to predetermined transmission processing such as up-conversion etc. in the RF section 202, and then transmitted as a radio signal via antenna 201.

After that, the mobile station apparatus 102 receives via antenna 301 the signal transmitted as a radio signal from the base station apparatus 101. The signal received by antenna 301 is subjected to predetermined reception processing such as down-conversion etc. in the RF section 302, and outputted to the despreading/demodulating section 303.

Then, the received signal inputted from the RF section 302 is despread and demodulated in the despreading/demodulating section 303, and outputted to the CRC section 304 and the CIR measuring section 306.

Then, CIR of the pilot burst signal included in the despread and demodulated received signal is measured in the CIR measuring section 306. The measured CIR value is outputted to the rate request value deciding section 307.

Then, in the rate request value deciding section 307, a rate corresponding to the measured CIR value is selected from the previously stored data transmission rates, and outputted to the rate request value transmission controlling section 308 as the mobile station's own rate request value.

On the other hand, CRC check on the received signal which has been despread and demodulated is performed in the CRC section 304, and, as a result of the CRC check, when no error is detected, the received signal is outputted to the disassembling section 305. When error is detected, the received signal is not outputted to the disassembling section 305.

Then, in the disassembling section 305, on receiving the despread and demodulated received signal from the CRC section 304, the received signal is disassembled to pick out the average rate signal broadcasted by the base station apparatus 101. The average rate signal thus obtained is outputted to the rate request value transmission controlling section 308.

Then, in the rate request value transmission controlling section 308, the difference between the own rate request value decided in the rate request value deciding section 307 and the average rate signal broadcasted by the base station apparatus 101 is obtained, and only when the obtained difference is larger than the previously set threshold value (reference value), the rate request value is outputted to the multiplexing section 309. That is to say, when the difference between the rate request value and the average rate is not more than the threshold value, the rate request value is not outputted to the multiplexing section 309 (that is, it is not transmitted to the base station apparatus 101).

Then, the rate request value inputted to the multiplexing section 309 is multiplexed with its own transmission signal (for example, a pilot symbol signal for controlling the transmit power, etc.) in the multiplexing section 309. This multiplexed signal is modulated and spread in the modulating/spreading section 301, subjected to the predetermined transmission processing such as up-conversion etc., and then transmitted as a radio signal via antenna 301.

After that, the base station apparatus 101 receives via antenna 201 the signal transmitted as a radio signal from the mobile station apparatus 102. The signal received via antenna 201 is subjected to the predetermined reception processing such as down-conversion etc. in the RF section 202, and outputted to the despreading/demodulating section 208.

Then, the received signal inputted from the RF section 202 is despread and demodulated in the despreading/demodulating section 208, and outputted to the TPC generating section 211 and the radio resource controlling section 212.

Then, a TPC signal for controlling transmit power of the mobile station apparatus 102 is generated according to the pilot symbol signal included in the despread and demodulated received signal in the TPC generating section 211. The generated TPC signal is assembled into a MAC channel in the MAC channel assembling section 210, modulated and spread in the modulating/spreading section 206, and outputted to the multiplexing section 203.

On the other hand, the mobile station apparatus 102 to which the data is transmitted is selected in the radio resource controlling section 212 based on the rate request value included in the received signal that has been despread and demodulated. Specifically, for example, the rate request values from the respective mobile station apparatuses 102 are compared, and the mobile station apparatus 102 that has the largest rate request value is selected. This selection result is outputted to the buffering section 216 and the dedicated channel coding section 209. In addition, the radio resource controlling section 212 outputs a signal that specifies the modulating mode (for example, QPSK, 16QAM, 64QAM, etc.) to the modulating/spreading section 205.

Furthermore, the criterion of selecting the mobile station apparatus 102 is not limited to the example described above. For example, in order to allow every mobile station apparatus 102 to carry out communication, such selection may be adopted that the mobile station apparatus 102 which has a small rate request value is selected. However, in this case, the average data transmission rate (throughput) of the base station apparatus 101 is decreased.

Then, in the buffering section 216, the transmission data for the selected mobile station apparatus 102 is read out. To the read out transmission data is given destination information for the relevant mobile station apparatus 102 in the dedicated channel coding section 209. The data to which the destination information is given is modulated in accordance with the specified modulating mode and spread in the modulating/spreading section 205, and then outputted to the multiplexing section 203.

Moreover, the radio resource controlling section 212 outputs information on the rate that has been used for data transmission to the selected mobile station apparatus 102 sequentially to the average rate calculating section 214.

Then, the average value (average rate) of the rates that have been used for data transmission to the selected mobile station apparatus 102 is calculated in the average rate calculating section 214. The average rate signal is assembled as broadcast channel information in the broadcast channel assembling section 215, modulated and spread in the modulating/spreading section 207, and then outputted to the multiplexing section 203.

The respective signals described above and outputted to the multiplexing section 203 (TPC signal, transmission data with destination information, average rate signal and pilot burst signal) are multiplexed in the multiplexing section 203, subjected to the predetermined transmission processing such as up-conversion etc. in the RF section 202, and then transmitted as a radio signal via antenna 201.

After that, the mobile station apparatus 102 receives the signal from the base station apparatus 101, and when its own destination information is included in that received signal, receives the succeeding transmission data.

Therefore, according to the mobile communication system of this embodiment, since the mobile station apparatus 102 transmits the rate request value to the base station 101 only when no error exists in the received signal and when the difference between the rate request value and the average rate is larger than a threshold value, it is not necessary to transmit the rate request value all the time like the conventional art, and it is possible to increase in efficiency of transmission timing of the data transmission rate request value to prevent wasteful power consumption and hence reduce power consumption in a mobile communication using a shared channel.

(Second Embodiment)

Figure 4:
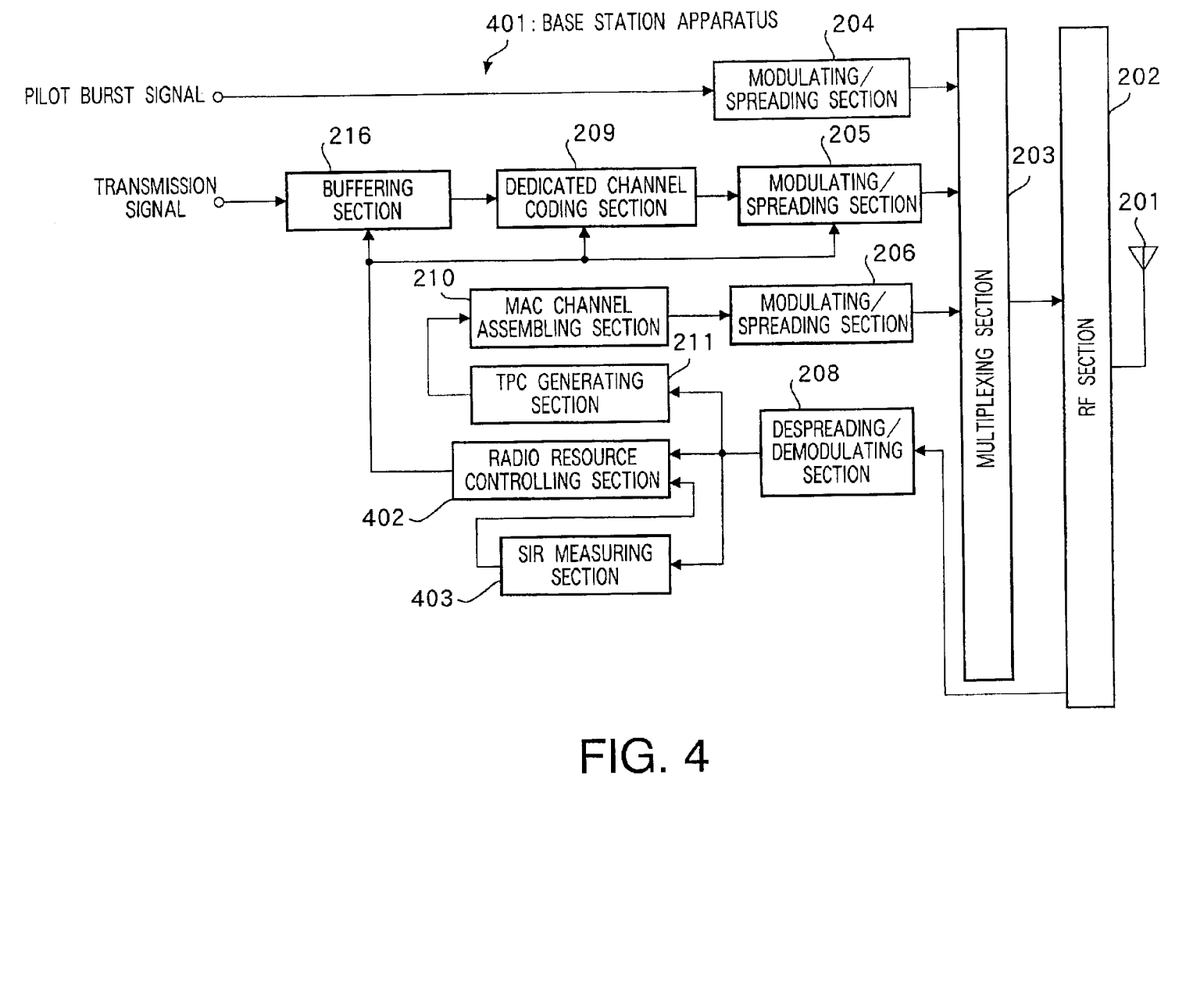
FIG. 4 is a block diagram illustrating a constitution of a base station apparatus in a mobile communication system according to a second embodiment of the present invention.
Figure 5:
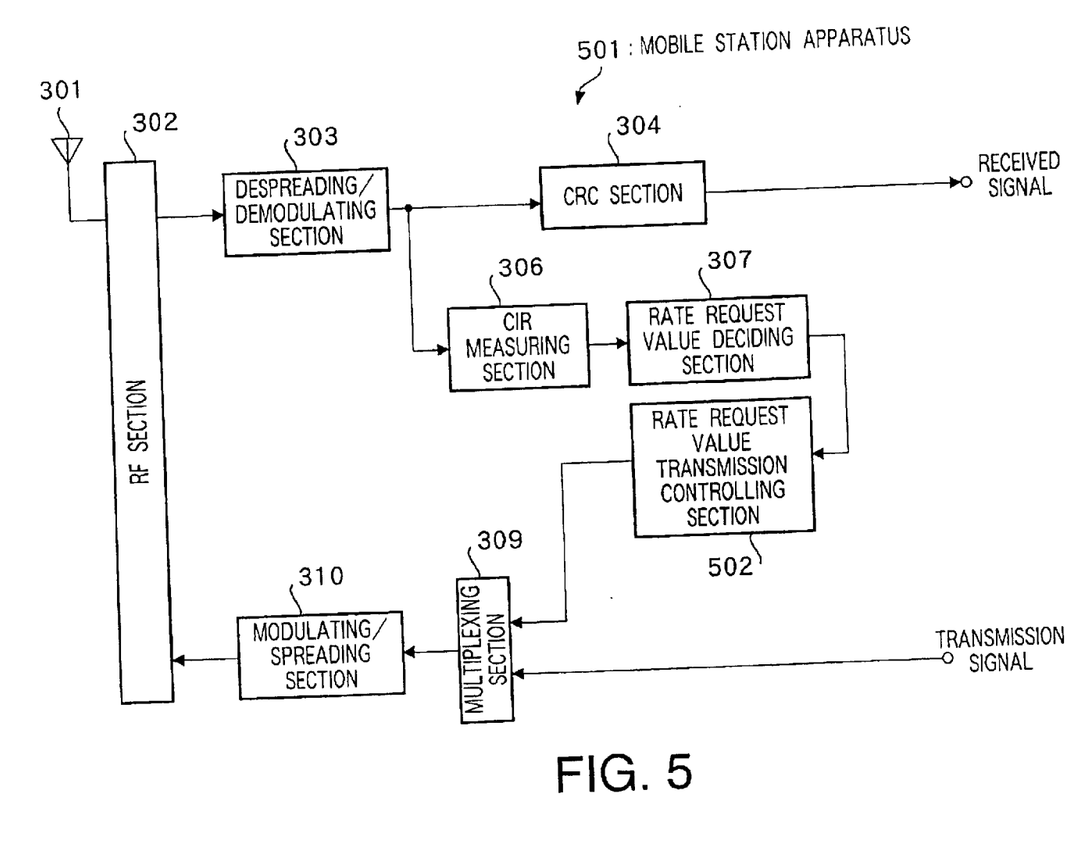
FIG. 5 is a block diagram illustrating a constitution of a mobile station apparatus in the mobile communication system according to the second embodiment of the present invention.

FIG. 4 is a block diagram illustrating a constitution of a base station apparatus in a mobile communication system according to a second embodiment of the present invention, FIG. 5 is a block diagram illustrating a constitution of a mobile station apparatus in the mobile communication system according to the second embodiment. The base station apparatus and the mobile station apparatus of the mobile communication system have the same basic structure as the base station apparatus and the mobile station apparatus in the first embodiment shown in FIG. 2 and FIG. 3 respectively, so that the identical component elements are given with the same reference numeral and their description will be omitted.

The base station apparatus 401 shown in FIG. 4 includes, in addition to the antenna 201, the RF section 202, the multiplexing section 203, the three modulating/spreading section 204, 205 and 206, the despreading/demodulating section 208, the dedicated channel coding section 209, the MAC channel assembling section 210, the TPC generating section 211 and the buffering section 216 as described above, a radio resource controlling section 402 and a SIR (Signal to Interference Ratio; the ratio of desired signal power to interference signal power) measuring section 403 which are essential elements of this embodiment.

The mobile station apparatus 501 shown in FIG. 5 includes, in addition to the antenna 301, the RF section 302, the despreading/demodulating section 303, the CRC section 304, the CIR measuring section 306, the rate request value deciding section 307, the multiplexing section 309 and the modulating/spreading section 310 as described above, a rate request value transmission controlling section 502 which is an essential element of this embodiment.

Next, the operation of the mobile communication system having the constitution as described above will be described. As for the parts that are the same as those in the first embodiment, the description thereof will be omitted or just briefly described.

First, the base station apparatus 401 multiplexes the pilot burst signal that has been modulated and spread with other signals that have been modulated and spread, and transmits the multiplexed signals as a radio signal.

After that, the mobile station apparatus 501, on receiving the signal transmitted from the base station apparatus 401, measures CIR of the pilot burst signal in the CIR measuring section 306, decides a rate request value corresponding to the measured CIR value in the rate request value deciding section 307 and outputs the decided rate request value to the rate request value transmission controlling section 502. The rate request value transmission controlling section 502 has a function of storing the rate request value.

Then, the rate request value transmission controlling section 502, utilizing the function of storing the rate request value, compares the present rate request value from the rate request value deciding section 307 with the previous rate request value, and only when the present rate request value is different from the previous rate request value, outputs the present rate request value to the multiplexing section 309. That is to say, when the present rate request value is the same as the previous rate request value, the present rate request value is not outputted to the multiplexing section 309 (that is, it is not transmitted to the base station apparatus 401).

Then, the multiplexing section 309 multiplexes, when the rate request value is inputted from the rate request value transmission controlling section 502, the input rate request value with its own transmission signal which includes the pilot symbol signal for controlling the transmit power, and then transmits the multiplexed signals as a radio signal. On the contrary, when the rate request value is not inputted, only the pilot symbol signal for controlling transmission power is transmitted as a radio signal.

After that, the base station apparatus 401 receives the signal transmitted as a radio signal from the mobile station apparatus 501, processes the received signal in the despreading/demodulating section 208, and then outputs the processed received signal to the TPC generating section 211, the radio resource controlling section 402 and the SIR measuring section 403.

Then, when the rate request value is included in the received signal, similar to the radio resource controlling section 212 in the first embodiment, the radio resource controlling section 402 selects the mobile station apparatus 102 to which the data is transmitted based on the rate request value. Specifically, for example, the rate request values from the respective mobile station apparatus 102 are compared and the mobile station apparatus 102 that has the largest rate request value is selected. Then, the transmission data for the selected mobile station apparatus 501 is read out in the buffering section 216, and to this read out transmission data is given destination information for the relevant mobile station apparatus 501 in the dedicated channel coding section 209.

On the contrary, when the rate request value is not included in the received signal, i.e., when the rate request value is not received but only the pilot symbol signal is received, the radio resource controlling section 402 inputs the measured SIR value of the received signal from the SIR measuring section 403, and decides whether or not the input measured SIR value is equal to or larger than a preset threshold value (reference value), that is, whether or not the reception quality is equal to or higher than the preset quality. As a result, when the measured SIR value is equal to or larger than the threshold value, the radio resource controlling section 402 decides that the mobile station apparatus 501 did not transmit rate request value this time since its value was the same as the previous rate request value, and, as for the relevant mobile station apparatus 501, performs the above-mentioned selection (selection of the mobile station apparatus 501 from which the data is transmitted) using the rate request value that has been previously received.

Therefore, according to the mobile communication system of this embodiment, since the mobile station apparatus 501 transmits the latest rate request value to the base station 401 only when the latest rate request value is different from the previous rate request value, and the base station apparatus 401 selects the mobile station apparatus to which the date is transmitted using the rate request value previously received when the base station apparatus 401 dose not receive the rate request value this time from the mobile station apparatus 501 and when the measured SIR value of the received signal is equal to or larger than the threshold value, it is not necessary for the mobile station apparatus to transmit the rate request value all the time like the conventional art, and it is possible to increase in efficiency of transmission timing of the data transmission rate request value to prevent wasteful power consumption and hence reduce power consumption in a mobile communication using a shared channel.

Further, since SIR value is used as a reception quality, the base station apparatus 401 can measure correctly the quality of the received signal, and perform the above-mentioned selection correctly.

(Third Embodiment)

A third embodiment is the case where the mobile station apparatus transmits the rate request value to the base station apparatus 401 even if there is no change in the rate request value, when such a state has been continued for a predetermined period of time that the mobile station apparatus does not transmit the latest rate request value to the base station apparatus 401 since the latest rate request value is the same as the previous rate request value in the second embodiment.

Figure 6A:
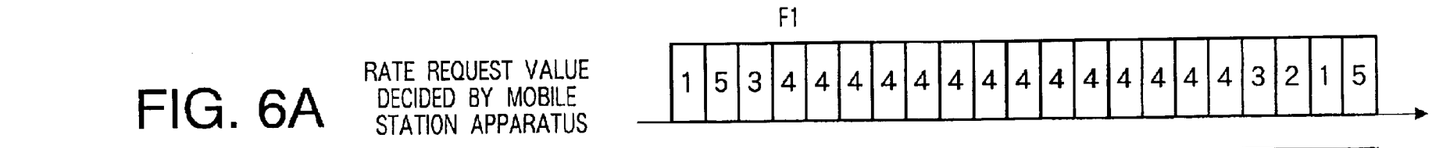
FIG. 6 is a diagram used for illustrating transmission timing of the rate request value in the mobile station apparatus of the mobile communication system according to the second embodiment of the present invention.
Figure 6B:
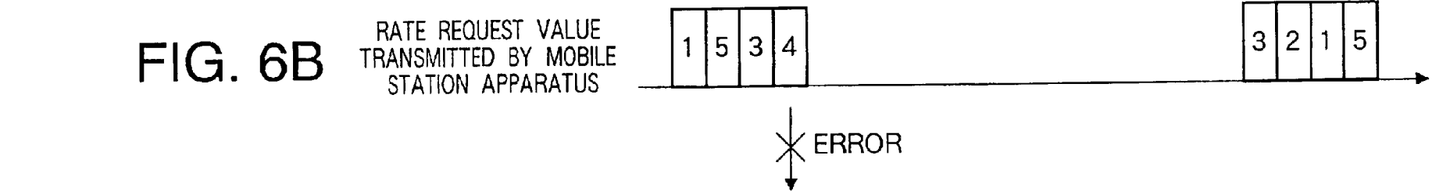
Figure 6C:
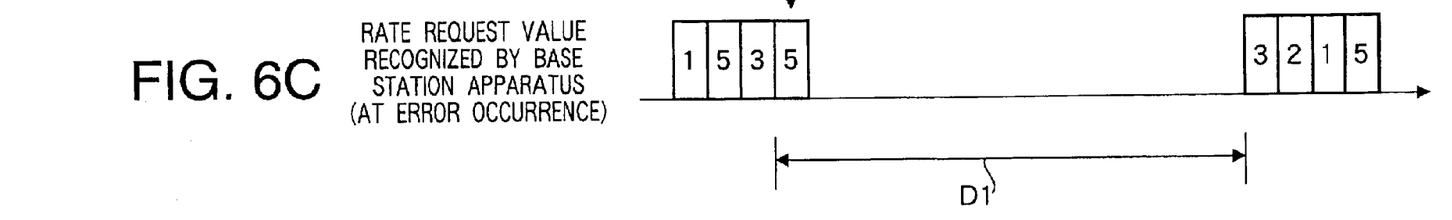

FIG. 6 is a diagram used for illustrating transmission timing of the rate request value in the mobile station apparatus 501 of the second embodiment, wherein FIG. 6A shows an example of the rate request value decided by the mobile station apparatus 501, FIG. 6B shows an example of the rate request value transmitted from the mobile station apparatus 501, and FIG. 6C shows an example of the rate request value recognized by the base station apparatus 401 when an error has occurred.

In the second embodiment, as shown in FIG. 6B, the rate request value is transmitted only when the rate request value has changed. At this time, for example, when the rate request value ("4") which corresponds to the frame F1 immediately before the rate request value becomes not to change is transmitted from the mobile station apparatus 501 to the base station apparatus 401, and when the rate request value is erroneously recognized by the base station apparatus 401 (for example, "4"→"5") as shown in FIG. 6C, then consequently the erroneous rate request value is continuously recognized by the base station apparatus 401 during the period D1 until the rate request value is transmitted again. Accordingly, the base station apparatus 401 selects the target to which the data is transmitted (mobile station apparatus 501) based on the erroneous rate request value until the rate request value changes next time, so that there is a possibility that the above-mentioned selection may not be made correctly during the period D1 where the rate request value does not change.

So, in this embodiment, the mobile station apparatus (hereinafter, the mobile station apparatus in this embodiment is given with a reference number "501a") transmits the rate request value to the base station apparatus 401 even if there is no change in the rate request value, when such a state has been continued for a predetermined period of time that the mobile station apparatus does not transmit the rate request value. That is, even when there is no change in the rate request value, the rate request value is retransmitted to the base station apparatus 401 at a predetermined period.

Figure 7A:
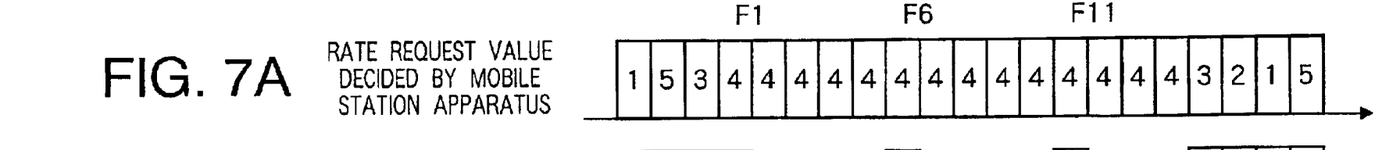
FIG. 7 is a diagram used for illustrating transmission timing of the rate request value in a mobile station apparatus of a mobile communication system according to a third embodiment of the present invention.
Figures 7B, 7C:
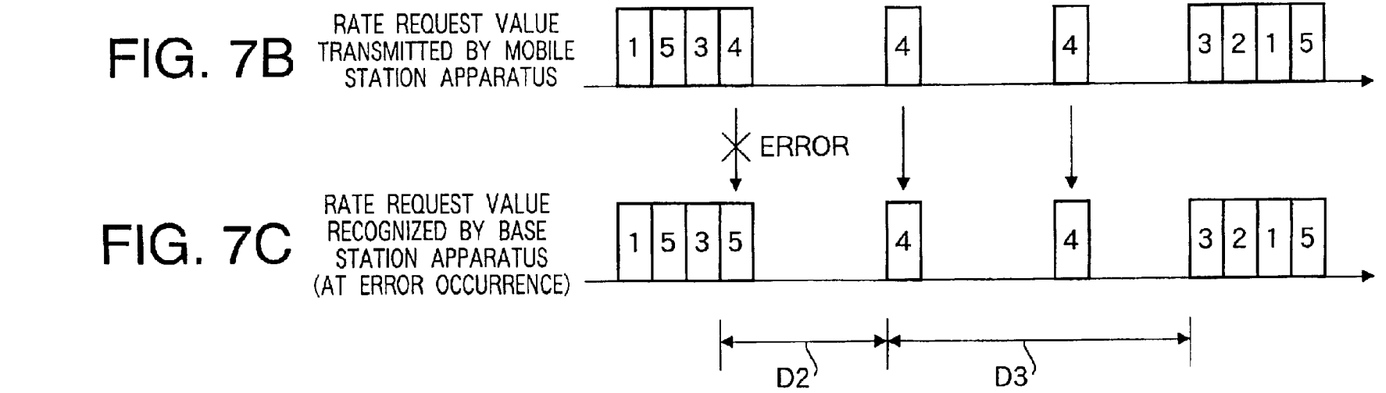

FIG. 7 is a diagram corresponding to FIG. 6 and used for illustrating transmission timing of the rate request value in the mobile station apparatus 501a of this embodiment, wherein FIG. 7A shows an example of the rate request value decided by the mobile station apparatus 501a, FIG. 7B shows an example of the rate request value transmitted by the mobile station apparatus 501a, and FIG. 7C shows an example of the rate request value recognized by the base station apparatus 401 when an error has occurred.

In this embodiment, even in a period when the rate request value does not change, for example, as shown in FIG. 7B, in the case where such a state that the rate request value is not transmitted for four frames successively, the rate request value is bound to be transmitted at the fifth frame (in the example of FIG. 7, frame F6 and frame F11) even when there is no change in the rate request value. That is to say, the rate request value is transmitted at a period of five frames. Accordingly, as shown in FIG. 7C, even when the rate request value corresponding to the frame immediately before the rate request value becomes not to change (in the example of FIG. 7, frame F1) is erroneously recognized by the base station apparatus 401, the same rate request value is transmitted from the mobile station apparatus 501a at a period of five frames, so that the base station apparatus 401 is able to recognize the correct rate request value and to correct the error of the rate request value promptly as long as the above rate request value is received correctly. That is, the time (duration) when erroneous information is held is reduced from D1 to D2 (D1=D2+D3). Here, the durations D1 and D2 denote durations when the base station apparatus 401 misrecognizes the rate request value and the duration D3 denotes a duration when the base station apparatus 401 recognizes the rate request value correctly.

Therefore, according to the mobile communication system in this embodiment, since the mobile station apparatus 501a transmits (retransmits) the rate request value to the base station apparatus 401 at a predetermined period even if there is no change in the rate request value, when such a state has been continued for a predetermined period of time that the mobile station apparatus 501a does not transmit the rate request value, the period of time when an erroneous rate request value is held in the base station apparatus 401 can be reduced, and the base station apparatus 401 can select promptly and correctly the target to which the data is transmitted.

Further, although the period of retransmitting the rate request value is five frames in this embodiment, it is not limited to this. The period for retransmission of the rate request value is changeable appropriately depending on the propagation conditions. For example, when the propagation conditions change drastically, by reducing the period of retransmission, and when the propagation conditions do not change so drastically, by elongating the period of retransmission, respectively, the power consumption of the mobile station apparatus 501a can be reduced and the above-mentioned selection in the base station apparatus 401 can be carried out more correctly.

Furthermore, although the present invention is applicable, particularly to the shared channel used in HDR which is applied to cdma2000, it is not limited to this, for example, the same is also applicable to a desired adaptive modulation system in which a base station apparatus transmits data at a data transmission rate requested by a mobile station apparatus.

This application is based on the Japanese Patent Application No.2000-232268 filed on Jun. 26, 2000, and the Japanese Patent Application No.2000-204222 filed on Jul. 5, 2000, entire content of which is expressly incorporated by reference herein.

Industrial Applicability

The invention is applicable to a mobile communication system, and a base station apparatus and a mobile station apparatus constituting the same.

What is claimed is:

1. A mobile communication system comprising a mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, wherein the mobile station apparatus comprises:

first receiving means for receiving an average data transmission rate transmitted from the base station apparatus;

measuring means for measuring quality of the received signal from the base station apparatus;

deciding means for deciding the data transmission rate request value based on the reception quality measured by said measuring means;

first calculating means for calculating a difference between the data transmission rate request value decided by said deciding means and the average data transmission rate received by said first receiving means;

judging means for judging whether or not the result of calculation by said first calculating means is equal to or larger than a reference value; and first controlling means for making the data transmission rate request value decided by said deciding means be transmitted to the base station apparatus when it is judged by said judging means that the result of calculation by said first calculating means is equal to or larger than the reference value, and wherein the base station apparatus comprises:

second receiving means for receiving the data transmission rate request value transmitted from the mobile station apparatus;

selecting means for selecting the mobile station apparatus to which data is transmitted based on the data transmission rate request value received by said second receiving means;

second calculating means for calculating an average of a data transmission rate for transmitting data to the mobile station apparatus selected by said selecting means as the average data transmission rate; and second controlling means for making the average data transmission rate calculated by said second calculating means be transmitted to the mobile station apparatus.

2. A communication method in a mobile communication system comprising a mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

a first receiving step in which the mobile station apparatus receives an average data transmission rate transmitted from the base station apparatus;

a measuring step in which the mobile station apparatus measures quality of the received signal from the base station apparatus;

a deciding step in which the mobile station apparatus decides the data transmission rate request value based on the reception quality measured in said measuring step;

a first calculating step in which the mobile station apparatus calculates a difference between the data transmission rate request value decided in said deciding step and the average data transmission rate received in said first receiving step;

a judging step in which the mobile station apparatus judges whether or not the result of calculation in said first calculating step is equal to or larger than a reference value;

a first controlling step in which the mobile station apparatus makes the data transmission rate request value decided in said deciding step be transmitted to the base station apparatus when it is judged in said judging step that the result of calculation in said first calculating step is equal to or larger than the reference value;

a second receiving step in which the base station apparatus receives the data transmission rate request value transmitted from the mobile station apparatus;

a selecting step in which the base station apparatus selects the mobile station apparatus to which data is transmitted based on the data transmission rate request value received in said second receiving step;

a second calculating step in which the base station apparatus calculates an average of a data transmission rate for transmitting data to the mobile station apparatus selected in said selecting step as the average data transmission rate; and a second controlling step in which the base station apparatus makes the average data transmission rate calculated in said second calculating step be transmitted to the mobile station apparatus.

3. A mobile station apparatus used in a mobile communication system comprising the mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

first receiving means for receiving an average data transmission rate transmitted from the base station apparatus;

measuring means for measuring quality of the received signal from the base station apparatus;

deciding means for deciding the data transmission rate request value based on the reception quality measured by said measuring means;

first calculating means for calculating a difference between the data transmission rate request value decided by said deciding means and the average data transmission rate received by said first receiving means;

judging means for judging whether or not the result of calculation by said first calculating means is equal to or larger than a reference value; and first controlling means for making the data transmission rate request value decided by said deciding means be transmitted to the base station apparatus when it is judged by said judging means that the result of calculation by said first calculating means is equal to or larger than the reference value.

4. The mobile station apparatus according to claim 3, further comprising error detecting means for detecting an error of the received signal from the base station apparatus, and wherein said first controlling means makes the data transmission rate request value decided by said deciding means be transmitted to the base station apparatus when it is determined by said error detecting means that the received signal is errorless and when it is judged by said judging means that the result of calculation by said first calculating means is equal to or larger than the reference value.

5. A method of controlling information transmission in a mobile station apparatus used in a mobile communication system comprising the mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

a first receiving step of receiving an average data transmission rate transmitted from the base station apparatus;

a measuring step of measuring quality of the received signal from the base station apparatus;

a deciding step of deciding the data transmission rate request value based on the reception quality measured in said measuring step;

a first calculating step of calculating a difference between the data transmission rate request value decided in said deciding step and the average data transmission rate received in said first receiving step;

a judging step of judging whether or not the result of calculation in said first calculating step is equal to or larger than a reference value; and a first controlling step of making the data transmission rate request value decided in said deciding step be transmitted to the base station apparatus when it is judged in said judging step that the result of calculation in said first calculating step is equal to or larger than the reference value.

6. A base station apparatus used in a mobile communication system comprising a mobile station apparatus that transmits data transmission rate request value, and the base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

second receiving means for receiving the data transmission rate request value transmitted from the mobile station apparatus;

selecting means for selecting the mobile station apparatus to which data is transmitted based on the data transmission rate request value received by said second receiving means;

second calculating means for calculating an average of a data transmission rate for transmitting data to the mobile station apparatus selected by said selecting means as the average data transmission rate; and second controlling means for making the average data transmission rate calculated by said second calculating means be transmitted to the mobile station apparatus.

7. A method of controlling information transmission in a base station apparatus used in a mobile communication system comprising a mobile station apparatus that transmits data transmission rate request value, and the base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

a second receiving step of receiving the data transmission rate request value transmitted from the mobile station apparatus;

a selecting step of selecting the mobile station apparatus to which data is transmitted based on the data transmission rate request value received in said second receiving step;

a second calculating step of calculating an average of a data transmission rate for transmitting data to the mobile station apparatus selected in said selecting step as the average data transmission rate; and a second controlling step of making the average data transmission rate calculated in said second calculating step be transmitted to the mobile station apparatus.

8. A mobile communication system comprising a mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, wherein the mobile station apparatus comprises:

first measuring means for measuring quality of the received signal from the base station apparatus;

deciding means for deciding the data transmission rate request value based on the reception quality measured by said first measuring means;

first storing means for storing the data transmission rate request value decided by said deciding means;

first judging means for comparing the previous data transmission rate request value stored in said first storing means and the latest data transmission rate request value, and judging whether or not both thereof are different from each other; and controlling means for making the latest data transmission rate request value be transmitted to the base station apparatus when it is judged by said first judging means that the previous data transmission rate request value and the latest data transmission rate request value are different from each other, and wherein the base station apparatus comprises:

second measuring means for measuring quality of the received signal from the mobile station apparatus;

receiving means for receiving the data transmission rate request value transmitted from the mobile station apparatus;

second storing means for storing the data transmission rate request value received by said receiving means by relating it to the mobile station apparatus;

second judging means for judging, when there is any mobile station apparatus the data transmission rate request value of which has not been received this time by said receiving means, as for the relevant mobile station apparatus, whether or not the reception quality measured by said second measuring means is equal to or larger than a reference value; and control means for using, when it is judged by said second judging means that the measured value of the reception quality is equal to or larger than the reference value, as for the relevant mobile station apparatus, the previous data transmission rate request value stored in said second storing means as the data transmission rate request value to be used for selecting the mobile station apparatus to which data is transmitted.

9. A communication method in a mobile communication system comprising a mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

a first measuring step in which the mobile station apparatus measures quality of the received signal from the base station apparatus;

a deciding step in which the mobile station apparatus decides the data transmission rate request value based on the reception quality measured in said first measuring step;

a first judging step in which the mobile station apparatus compares the previous data transmission rate request value stored in first storing means for storing the data transmission rate request value decided in said deciding step and the latest data transmission rate request value, and judges whether or not both thereof are different from each other;

a controlling step in which the mobile station apparatus makes the latest data transmission rate request value be transmitted to the base station apparatus when it is judged in said first judging step that the previous data transmission rate request value and the latest data transmission rate request value are different from each other;

a second measuring step in which the base station apparatus measures quality of the received signal from the mobile station apparatus;

a receiving step in which the base station apparatus receives the data transmission rate request value transmitted from the mobile station apparatus;

a second judging step in which the base station apparatus judges, when there is any mobile station apparatus the data transmission rate request value of which has not been received this time in said receiving step, as for the relevant mobile station apparatus, whether or not the reception quality measured in said second measuring step is equal to or larger than a reference value; and a control step in which the base station apparatus uses, when it is judged in said second judging step that the measured value of the reception quality is equal to or larger than the reference value, as for the relevant mobile station apparatus, the previous data transmission rate request value stored in second storing means for storing the data transmission rate request value received in said receiving step by relating it to the mobile station apparatus as the data transmission rate request value to be used for selecting the mobile station apparatus to which data is transmitted.

10. A mobile station apparatus used in a mobile communication system comprising the mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

first measuring means for measuring quality of the received signal from the base station apparatus;

deciding means for deciding the data transmission rate request value based on the reception quality measured by said first measuring means;

first storing means for storing the data transmission rate request value decided by said deciding means;

first judging means for comparing the previous data transmission rate request value stored in said first storing means and the latest data transmission rate request value, and judging whether or not both thereof are different from each other; and controlling means for making the latest data transmission rate request value be transmitted to the base station apparatus when it is judged by said first judging means that the previous data transmission rate request value and the latest data transmission rate request value are different from each other.

11. The mobile station apparatus according to claim 10, wherein said controlling means makes the latest data transmission rate request value be transmitted periodically to the base station apparatus when it is judged by said first judging means that the previous data transmission rate request value and the latest data transmission rate request value are the same.

12. A method of controlling information transmission in a mobile station apparatus used in a mobile communication system comprising the mobile station apparatus that transmits data transmission rate request value, and a base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

a first measuring step of measuring quality of the received signal from the base station apparatus;

a deciding step of deciding the data transmission rate request value based on the reception quality measured in said first measuring step;

a first judging step of comparing the previous data transmission rate request value stored in first storing means for storing the data transmission rate request value decided in said deciding step and the latest data transmission rate request value, and judging whether or not both thereof are different from each other; and a controlling step of making the latest data transmission rate request value be transmitted to the base station apparatus when it is judged in said first judging step that the previous data transmission rate request value and the latest data transmission rate request value are different from each other.

13. A base station used in a mobile communication system comprising a mobile station apparatus that transmits data transmission rate request value, and the base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

second measuring means for measuring quality of the received signal from the mobile station apparatus;

receiving means for receiving the data transmission rate request value transmitted from the mobile station apparatus;

second storing means for storing the data transmission rate request value received by said receiving means by relating it to the mobile station apparatus;

second judging means for judging, when there is any mobile station apparatus the data transmission rate request value of which has not been received this time by said receiving means, as for the relevant mobile station apparatus, whether or not the reception quality measured by said second measuring means is equal to or larger than a reference value; and control means for using, when it is judged by said second judging means that the measured value of the reception quality is equal to or larger than the reference value, as for the relevant mobile station apparatus, the previous data transmission rate request value stored in said second storing means as the data transmission rate request value to be used for selecting the mobile station apparatus to which data is transmitted.

14. The base station apparatus according to claim 13, wherein the reception quality measured by said second measuring means is an SIR of a predetermined pilot symbol signal.

15. A method of controlling information transmission in a base station apparatus used in a mobile communication system comprising a mobile station apparatus that transmits data transmission rate request value, and the base station apparatus that selects the mobile station apparatus to which data is transmitted based on the data transmission rate request value received from the mobile station apparatus and transmits data to the selected mobile station apparatus at the data transmission rate request value received from the selected mobile station apparatus, comprising:

a second measuring step of measuring quality of the received signal from the mobile station apparatus;

a receiving step of receiving the data transmission rate request value transmitted from the mobile station apparatus;

a second judging step of judging, when there is any mobile station apparatus the data transmission rate request value of which has not been received this time in said receiving step, as for the relevant mobile station apparatus, whether or not the reception quality measured in said second measuring step is equal to or lager than a reference value; and a control step of using, when it is judged in said second judging step that the measured value of the reception quality is equal to or larger than the reference value, as for the relevant mobile station apparatus, the previous data transmission rate request value stored in second storing means for storing the data transmission rate request value received in said receiving step by relating it to the mobile station apparatus as the data transmission rate request value to be used for selecting the mobile station apparatus to which data is transmitted.

* * * * *